(12) United States Patent
Ishiguro et al.

(10) Patent No.: US 12,436,161 B2
(45) Date of Patent: Oct. 7, 2025

(54) ANALYSIS DEVICE, ANALYSIS METHOD, AND ANALYSIS PROGRAM

(71) Applicant: PHC Corporation, Toon (JP)

(72) Inventors: Masatoshi Ishiguro, Tokyo (JP); Miyuki Azuma, Tokyo (JP); Masayoshi Hayakawa, Gunma (JP); Hiroyuki Shimizu, Gunma (JP); Kei Asano, Gunma (JP)

(73) Assignee: PHC Corporation, Toon (JP)

( * ) Notice: Subject to any disclaimer, the term of this patent is extended or adjusted under 35 U.S.C. 154(b) by 817 days.

(21) Appl. No.: 17/754,420

(22) PCT Filed: Oct. 2, 2020

(86) PCT No.: PCT/JP2020/037623
§ 371 (c)(1),
(2) Date: Mar. 31, 2022

(87) PCT Pub. No.: WO2021/066165
PCT Pub. Date: Apr. 8, 2021

(65) Prior Publication Data
US 2022/0341960 A1    Oct. 27, 2022

(30) Foreign Application Priority Data
Oct. 2, 2019   (JP) .................................. 2019-182496

(51) Int. Cl.
*G01N 35/10*   (2006.01)
*G01N 21/78*   (2006.01)
(Continued)

(52) U.S. Cl.
CPC ..... *G01N 35/1016* (2013.01); *G01N 35/1011* (2013.01); *G01N 2035/1023* (2013.01)

(58) Field of Classification Search
None
See application file for complete search history.

(56) References Cited

U.S. PATENT DOCUMENTS

| 2010/0107744 A1 | 5/2010 | Fukuda et al. |
| 2011/0236990 A1 | 9/2011 | Mizutani et al. |
| (Continued) | | |

FOREIGN PATENT DOCUMENTS

| CN | 102265166 A | 11/2011 |
| CN | 109975565 A | 7/2019 |
| (Continued) | | |

OTHER PUBLICATIONS

Examination Report in Japanese Application No. 20872260.3 dated Dec. 10, 2024 (in 11 pages).
(Continued)

*Primary Examiner* — Maris R Kessel
*Assistant Examiner* — Madison Taylor Herbert
(74) *Attorney, Agent, or Firm* — Knobbe, Martens, Olson & Bear, LLP

(57) ABSTRACT

A composite analysis device, configured to perform a plurality of types of analyses, which prevent a shortage of a volume of a specimen. The analysis device can execute a plurality of measurement processing steps for a biological sample based on order information. The analysis device includes: a pierce nozzle unit which pierces a hole in a sealed sample container in which the biological sample is contained, collects the biological sample, and discharges the biological sample into a predetermined containing unit; a sample nozzle unit which dispenses the biological sample contained in the containing unit into one or more cuvettes; and a control device which control operations of the pierce nozzle unit and the sample nozzle unit based on the order information.

6 Claims, 12 Drawing Sheets

| POSITION | SPECIMEN ID | VOLUME (μL) | REMAINING TIME (Min) | FDP 5μL | D-DIMER 5μL | ANTITHROMBIN 5μL | PROTHROMBIN TIME 50μL | ACTIVATED THROMBOPLASTIN TIME 50μL | FIBRINOGEN 10μL |
|---|---|---|---|---|---|---|---|---|---|
| 1 | ID1 | 55 | | ○ | | | | | |
| 2 | ID2 | 0 | | | | | | | |
| 3 | ID3 | 150 | | | | | ○ | ○ | |
| 4 | ID4 | 0 | | | | | | | |
| 5 | ID5 | 55 | | | | ○ | | | |
| 6 | ID6 | 55 | | | ○ | | | | |
| 7 | ID7 | 0 | | | | | | | |
| 8 | ID8 | 60 | | | | | | | ○ |
| 9 | ID9 | 0 | | | | | | | |
| 10 | ID10 | 0 | | | | | | | |

(51) Int. Cl.
*G01N 33/49* (2006.01)
*G01N 33/86* (2006.01)

(56) References Cited

U.S. PATENT DOCUMENTS

| | | | |
|---|---|---|---|
| 2012/0222773 A1 | 9/2012 | Yamato | |
| 2012/0294763 A1* | 11/2012 | Fukuda et al. | G01N 35/1065 422/63 |
| 2014/0199772 A1 | 7/2014 | Kiss et al. | |
| 2015/0226761 A1 | 8/2015 | Mizutani et al. | |
| 2019/0204349 A1* | 7/2019 | Ariyoshi et al. | G01N 35/1011 |

FOREIGN PATENT DOCUMENTS

| | | | | |
|---|---|---|---|---|
| EP | 3382396 A1 | 10/2018 | | |
| EP | 3508858 A1 | 7/2019 | | |
| EP | 3671218 A1 | 6/2020 | | |
| JP | H01-196574 A | 8/1989 | | |
| JP | H08-278313 A | 10/1996 | | |
| JP | 2012-181136 A | 9/2012 | | |
| JP | 2014-059320 A | 4/2014 | | |
| JP | 2014206381 A | * 10/2014 | | G01N 35/02 |
| JP | 2016/085170 A | 5/2016 | | |
| JP | 2016-166793 A | 9/2016 | | |
| WO | WO 2016/002394 A1 | 1/2016 | | |
| WO | WO-2017043196 A1 | * 3/2017 | | B01L 3/5085 |
| WO | WO 2019/033312 A1 | 2/2019 | | |

OTHER PUBLICATIONS

International Search Report issued in International Application No. PCT/JP2020/037623, mailed on Dec. 8, 2020.

Extended European Search Report issued in EP Application No. 20872260.3, dated Oct. 13, 2023.

Chinese Office Action for App. No. 202080068320.4, dated Mar. 25, 2025 (in 12 pages).

* cited by examiner

FIG. 12

| POSITION | SPECIMEN ID | VOLUME (μL) | REMAINING TIME (Min) | FDP 5μL | D-DIMER 5μL | ANTITHROMBIN 5μL | PROTHROMBIN TIME 50μL | ACTIVATED THROMBOPLASTIN TIME 50μL | FIBRINOGEN 10μL |
|---|---|---|---|---|---|---|---|---|---|
| 1 | ID1 | 55 | | ○ | | | | | |
| 2 | ID2 | 0 | | | | | | | |
| 3 | ID3 | 150 | | | | | | ○ | |
| 4 | ID4 | 0 | | | | | | | |
| 5 | ID5 | 55 | | | | ○ | | | |
| 6 | ID6 | 55 | | | ○ | | | | |
| 7 | ID7 | 0 | | | | | | | |
| 8 | ID8 | 60 | | | | | | | ○ |
| 9 | ID9 | 0 | | | | | | | |
| 10 | ID10 | 0 | | | | | | | |

ANALYSIS DEVICE, ANALYSIS METHOD, AND ANALYSIS PROGRAM

TECHNICAL FIELD

The present invention relates to an analysis device, analysis method and analysis program.

BACKGROUND ART

A conventionally proposed method for a specimen analysis device that detects components contained in a specimen is a method of supplying a volume of a specimen required for analysis to a cuvette (an analysis container) if a first operation mode, in which re-inspection schedule is "No", is selected; and supplying a volume of a specimen that is more than the volume required for analysis to a cuvette (a reserve container) if a second operation mode, in which re-inspection schedule is "Yes", is selected (e.g. PTL 1).

PRIOR ART DOCUMENT

Patent Document

[PTL 1] Japanese Patent Application Publication No. 2014-59320

SUMMARY OF INVENTION

Technical Problem

A blood coagulation time, for example, differs depending on the specimen. In a standard automatic analysis device, a measurement time is initially set and the measurement is performed, and if the measurement does not complete within the measurement time due to an abnormality, re-inspection is performed separately. However, in the case of a composite analysis device which performs various types of measurement, it is inconvenient to secure a volume of a specimen that is more than usual in advance, just in case a re-inspection occurs. In other words, if a large volume of a specimen is secured in reserve, other inspections may not be performed in a case where a plurality of inspection items are on order, for example. Particularly in the blood coagulation time measurement, a relatively large volume of a specimen is used, and inefficiency is also high. Further, it is normally desired to perform many inspection items by one blood collection in order to ease the burden on the test subject caused by collecting blood a plurality of times or collecting a large volume of blood. At the same time, it is desired to downsize the device while ensuring the processing speed.

With the foregoing in view, it is an object of the present invention that, in a composite analysis device to perform a plurality of types of analysis, a technique to prevent a shortage of a specimen or to downsize the device while ensuring the processing speed is provided.

Solution to Problem

A composite analysis device according to the present invention is capable of performing a plurality of measurement processing steps for a biological sample based on order information. The composite analysis device includes: a pierce nozzle unit which pierces a hole in a sealed sample container in which the biological sample is contained, collects the biological sample, and discharge the biological sample into a predetermined containing unit; a sample nozzle unit which dispenses the biological sample contained in the containing unit into one or more cuvettes; and a control device which controls operations of the pierce nozzle unit and the sample nozzle unit based on the order information. A volume of the biological sample which the control device allows to discharge from the pierce nozzle unit into the containing unit may be not less than a total volume of a specimen required for each of the measurement processing steps included in the order information, which includes one or more blood coagulation time measurement processing steps, and the volume of the biological sample may not include a volume required for performing the blood coagulation time measurement processing step related to re-examination. The sample nozzle unit is capable of collecting a sample from a sample container having an opening, and a position at which the pierce nozzle unit collects the biological sample from the sealed sample container may be the same as a position at which the sample nozzle unit collects the biological sample from the sample container having the opening. A position of the containing unit to which the biological sample is discharged from the pierce nozzle unit may be the same as a position of the containing unit from which the sample nozzle unit collects the biological sample.

In the composite analysis device which performs various measurements, if a volume of a specimen for re-examination for a blood coagulation time measurement is prepared in advance, a volume of the specimen used for the measurement may become insufficient. By setting such that the volume of the biological sample discharged from the pierce nozzle unit into the containing unit is not less than the total volume of the specimen required for each of the measurement processing steps included in the order information, and the volume required for performing the blood coagulation time measurement processing step related to re-examination is not included, as described above, a shortage of the specimen can be prevented. Further, by the pierce nozzle unit and the sample nozzle unit collecting the sample at the same position, the device can be downsized, and by the pierce nozzle unit holding the biological sample in the containing unit and the sample nozzle unit dispensing the biological sample from the containing unit, the biological sample can be dispensed from the containing unit parallel with piercing a hole in a sealed sample container, and compared with the case of simply collecting the biological sample from a sample container having an opening, a drop in processing time can be minimized, even when the biological sample is collected after piercing a hole in the sealed sample container.

The composite analysis device may further include a coagulation measurement unit which holds the cuvette and outputs data, indicating the degree of the coagulation of blood contained in the cuvette, to the control device. In a case where a measurement time, which is initially determined, elapses and it is determined that the blood has not coagulated based on the data outputted by the coagulation measurement unit, the control device may extend the measurement time and may continue the measurement processing step. Since the measurement time is extended, it is not necessary to set a longer measurement time and perform re-examination when the initially set measurement time elapsed. Therefore it is not necessary to secure a specimen for re-examination in the containing unit. In other words, no issues occur to set the volume of the specimen to be discharged into the containing unit to a volume that does not include the volume required for performing the measurement processing for re-examination.

The control may execute the following in parallel: a processing step, to cause the sample nozzle unit to collect a biological sample from the containing unit and dispense the biological sample to the cuvettes, which is performed for a preceding processing target biological sample; and a processing step, to cause the pierce nozzle unit to collect a biological sample from the sealed sample container and discharge the biological sample into the containing unit, which is performed for a subsequent processing target biological sample. Then in a case of performing various measurement processing steps for a plurality of specimens continuously, the overall required time can be decreased. Further, it is not necessary to repeatedly pierce a hole in one sample container, and the entry of contaminants on the cap into the specimen can be prevented.

The sample nozzle unit is capable of collecting a sample from a sample container having an opening, and a position at which the pierce nozzle unit collects the biological sample from the sealed sample container may be the same as a position at which the sample nozzle unit collects the biological sample from the sample container having the opening, and a position of the containing unit to which the biological sample is discharged from the pierce nozzle unit may be the same as a position of the containing unit from which the sample nozzle unit collects the biological sample. Further, the pierce nozzle unit and the sample nozzle unit may have arc-shaped movable ranges centered around different points in a plan view, and the position at which the pierce nozzle unit collects the biological sample from the sealed sample container, the position at which the sample nozzle unit collects the biological sample from the sample container having the opening, the position of the containing unit to which the biological sample is discharged from the pierce nozzle unit, and the position of the containing unit from which the sample nozzle unit collects the biological sample, may be located at the intersections of the movable range of the pierce nozzle unit and the movable range of the sample nozzle unit respectively in a plan view. Then the pierce nozzle unit and the sample nozzle unit can temporarily contain the biological sample in the containing unit, and the sample nozzle unit can dispense an additional biological sample from the containing unit. In other words, even in the case of piercing a hole in the sealed sample container the biological sample can be dispensed from the containing unit in parallel, hence compared with the case of simply collecting the biological sample from a sample container having an opening, a drop in the processing time can be minimized, even when the biological sample is collected after piercing a hole in a sealed sample container. Moreover, the device can be downsized.

The contents described in "Solution to Problem" above may be combined as much as possible within the scope of not departing from the problem to be solved in the present invention and technical concepts thereof. The contents of the "Solution to Problem" may be provided as a system, including a device or a plurality of devices such as a computer, a method executed by the computer, or a program that causes the computer to execute the method. The program may be executed over a network. A storage medium storing this program may be provided.

Advantageous Effect of Invention

In a composite analysis device that performs a plurality of types of analyses, the present invention can provide a technique to prevent a shortage of a specimen.

BRIEF DESCRIPTION OF DRAWINGS

FIG. 12 is a table indicating an example of order information.

DETAILED DESCRIPTION OF THE PREFERRED EMBODIMENTS

A composite analysis device according to an embodiment will be described with reference to the drawings.

<Device Configuration>

Figure 1:
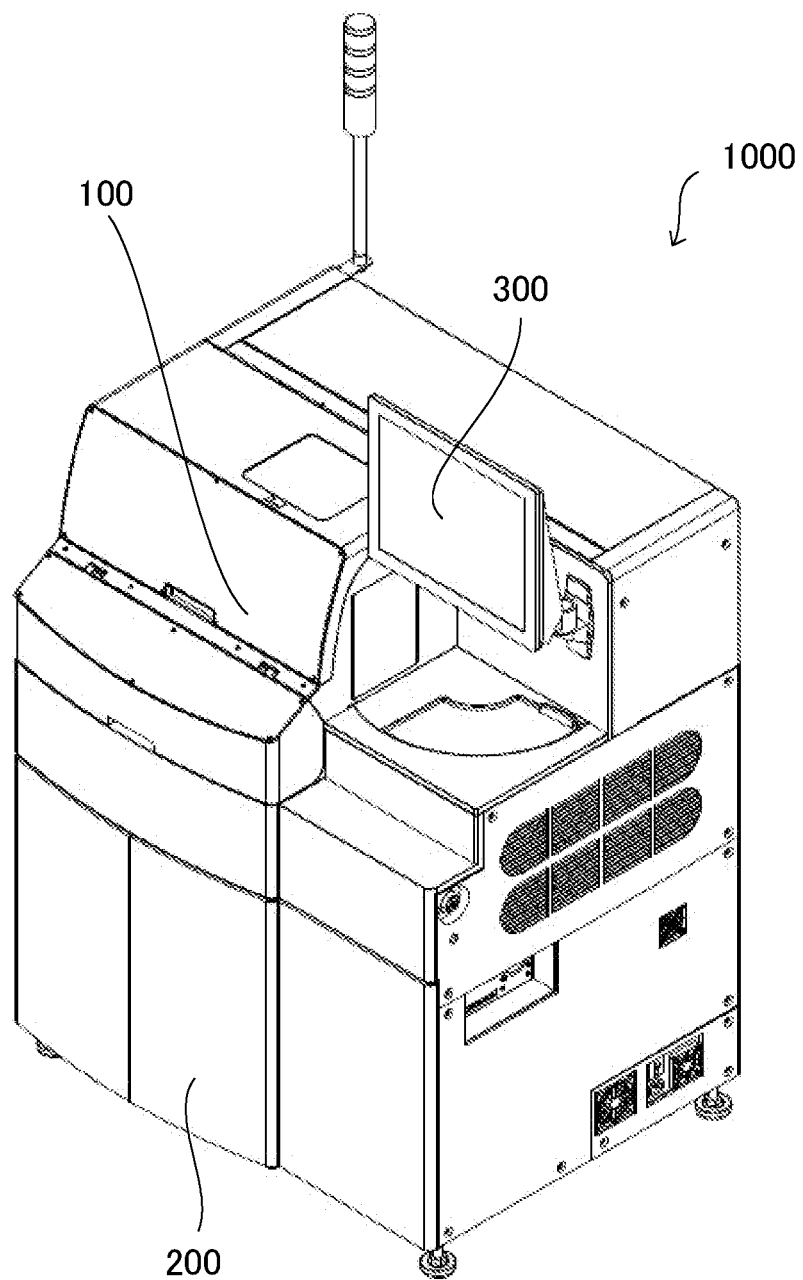
FIG. 1 is an external view depicting an example of a composite analysis device.

FIG. 1 is an external view depicting an example of a composite analysis device 1000. The composite analysis device 1000 is an analysis device that performs a plurality of types of analyses of which measurement accuracies are different, as in the case of biochemical analysis and immunological analysis. For example, the composite analysis device 1000 can perform latex photometric immunoassay (LPIA) and blood coagulation time measurement. The composite analysis device 1000 includes a measurement unit-housing portion 100, a tank-housing portion 200 and a monitor 300. The measurement unit-housing portion 100 houses a plurality of measurement units related to the present embodiment. The tank-housing portion 200 houses tanks that contain pure water, cleaning water and drainage respectively, a disposal box that collects disposed cuvettes, and a computer that controls the processing performed by the measurement unit. The monitor 300 is connected to the computer, and outputs the progress state, the result, and the like of the measurement. The monitor 300 may be an input/output device, such as a touch panel, on which the user can perform input operations.

Figure 2:
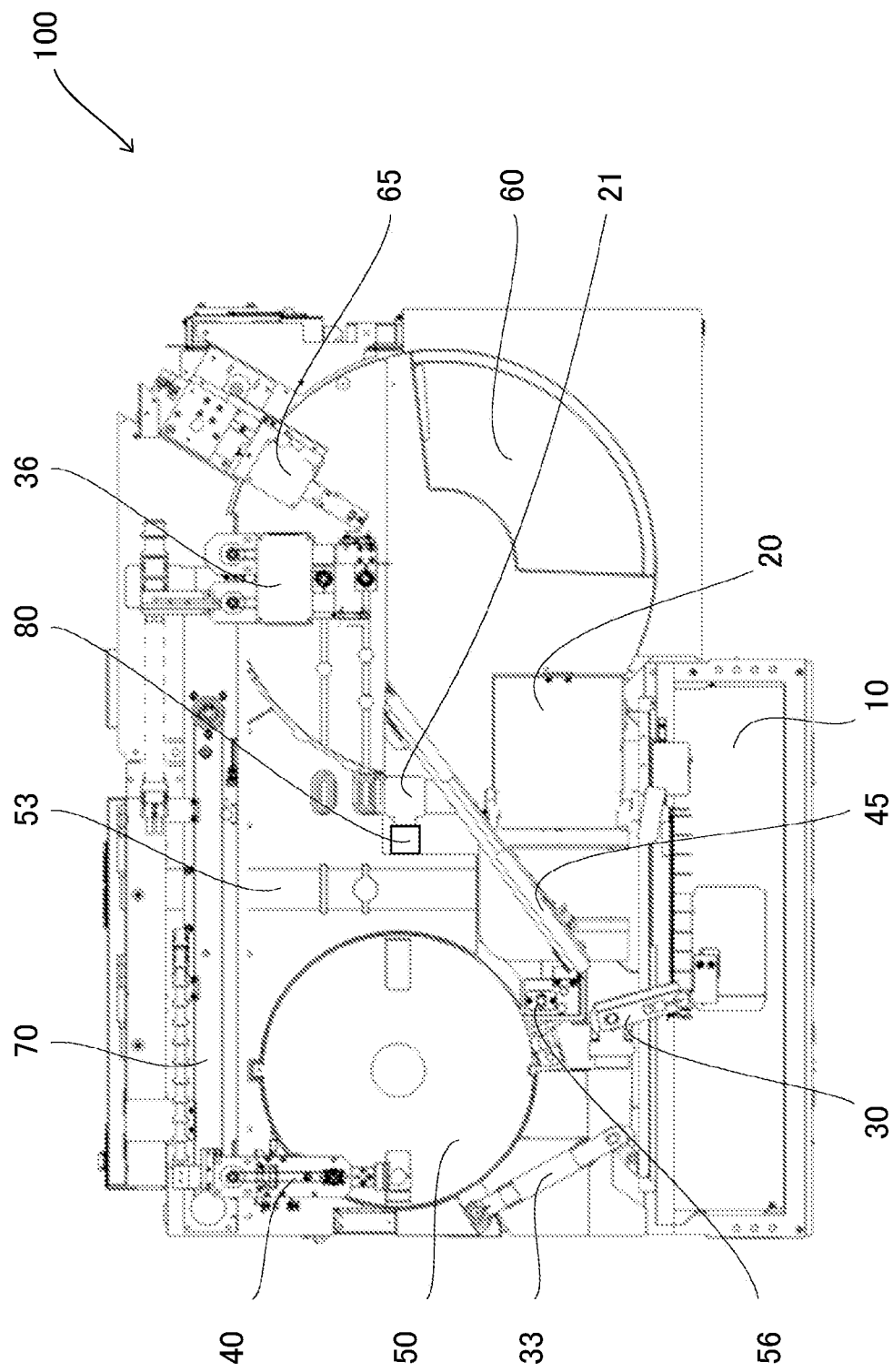
FIG. 2 is a plan view depicting an example of an internal configuration of a measurement unit housing portion of the composite analysis device.

FIG. 2 is a plan view depicting an example of an internal configuration of the measurement unit-housing portion 100 of the composite analysis device 1000. The measurement unit-housing portion 100 includes: a rack-installing portion 10 on which a sample rack is installed; a cuvette feeder 20 which supplies a cuvette to a cuvette supply port 21; a pierce nozzle unit 30 which pierces a hole in a cap of a blood collection tube, sucks such a specimen and discharges the specimen at a predetermined position; a sample nozzle unit 33 which sucks a specimen at a predetermined position; a reagent nozzle unit 36 which sucks a reagent from a reagent bottle and discharges the reagent at a predetermined position; a first cuvette-transporting unit 40 and a second cuvette-transporting unit 45 which transport cuvettes; an LPIA table 50 for performing measurement based on LPIA; a coagulation table 53 for performing the coagulation time measurement test; a temporary-holding port 56 which temporarily holds the cuvette; a reagent table 60 for holding the reagent bottle; a reagent cap open/close unit 65 which opens/closes the cap of the reagent bottle; a rail 70 connecting the first cuvette-transporting unit 40 and the reagent nozzle unit 36; and a cuvette-disposing port 80.

Figure 3:
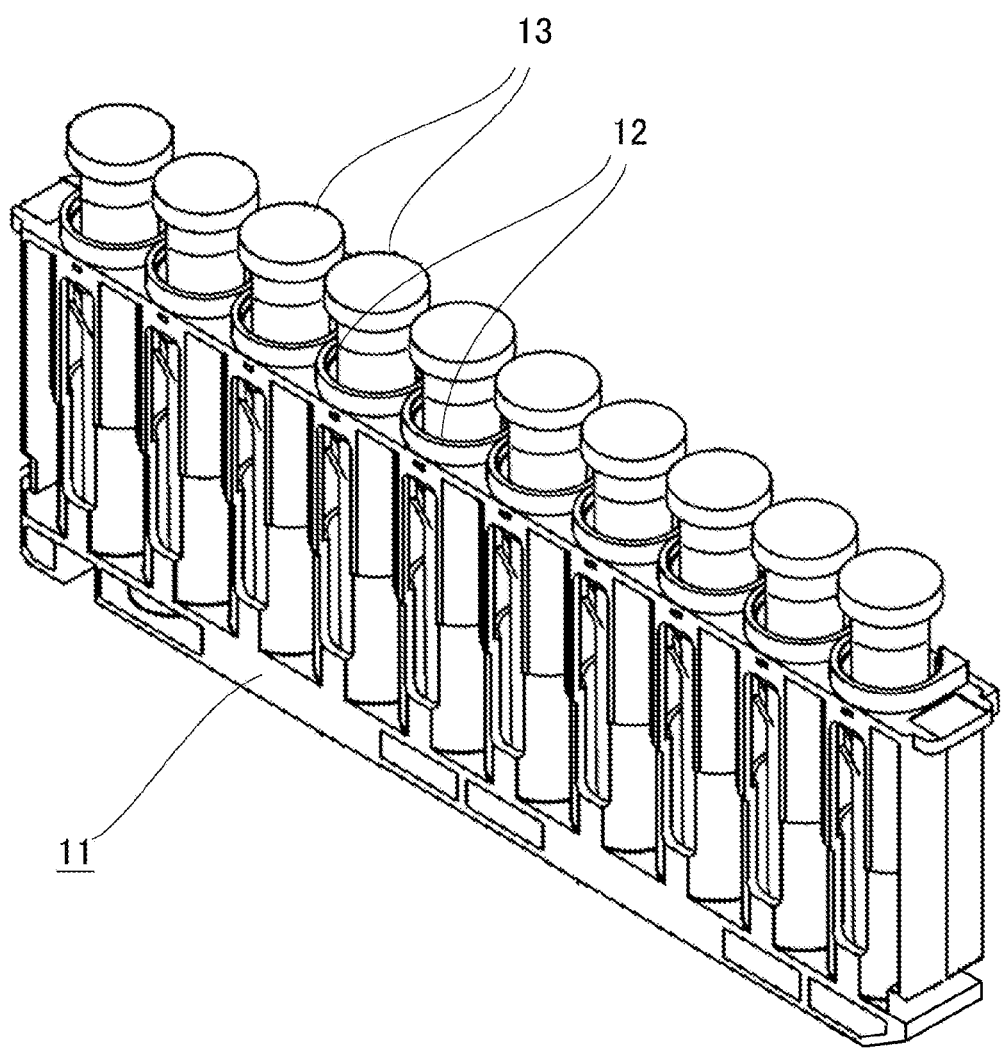
FIG. 3 is a perspective view depicting an example of a sample rack.

The rack-installing portion 10, on which a sample rack 11 is placed, is transported on the table by a predetermined mechanism. FIG. 3 is a perspective view depicting an example of the sample rack. The sample rack 11 has a plurality of holding holes 12 which are disposed in a line. Each of the holding holes 12 can hold a sample container 13 in which a blood specimen or the like is contained. The sample container 13 can be a sample cup containing a biological sample (also called a specimen), a blood collection tube containing blood, a double-blood collection tube, a blood collection tube with a plug, an overlay cup to dilute or mix a sample, or various other containers, and the height of the sample containers in the state of being held in the holding holes 12 may be different. The sample rack 11 is transported on the rack-installing portion 10 based on the control by the computer, and a desired sample container 13 is placed at a predetermined collecting position on the rack-installing portion 10. The collecting position exists on a locus where the pierce nozzle unit 30 and the sample nozzle unit 33 move in an arc shape in a plan view. The sample is dispensed by the pierce nozzle unit 30 into the cuvettes that are held in the temporal-holding port, or are dispensed by the sample nozzle unit 33 into the cuvettes that are held in the holding holes of the LPIA table 50. A label on which the identification information of the specimen is indicated by a barcode, a two-dimensional code, or the like, may be attached on the outer surface of the sample container 13, or such identification information may be directly printed on the outer surface of the sample container 13. Identification information to identify the sample rack 11 is attached on one end of the side face of the sample rack 11.

Figure 4:
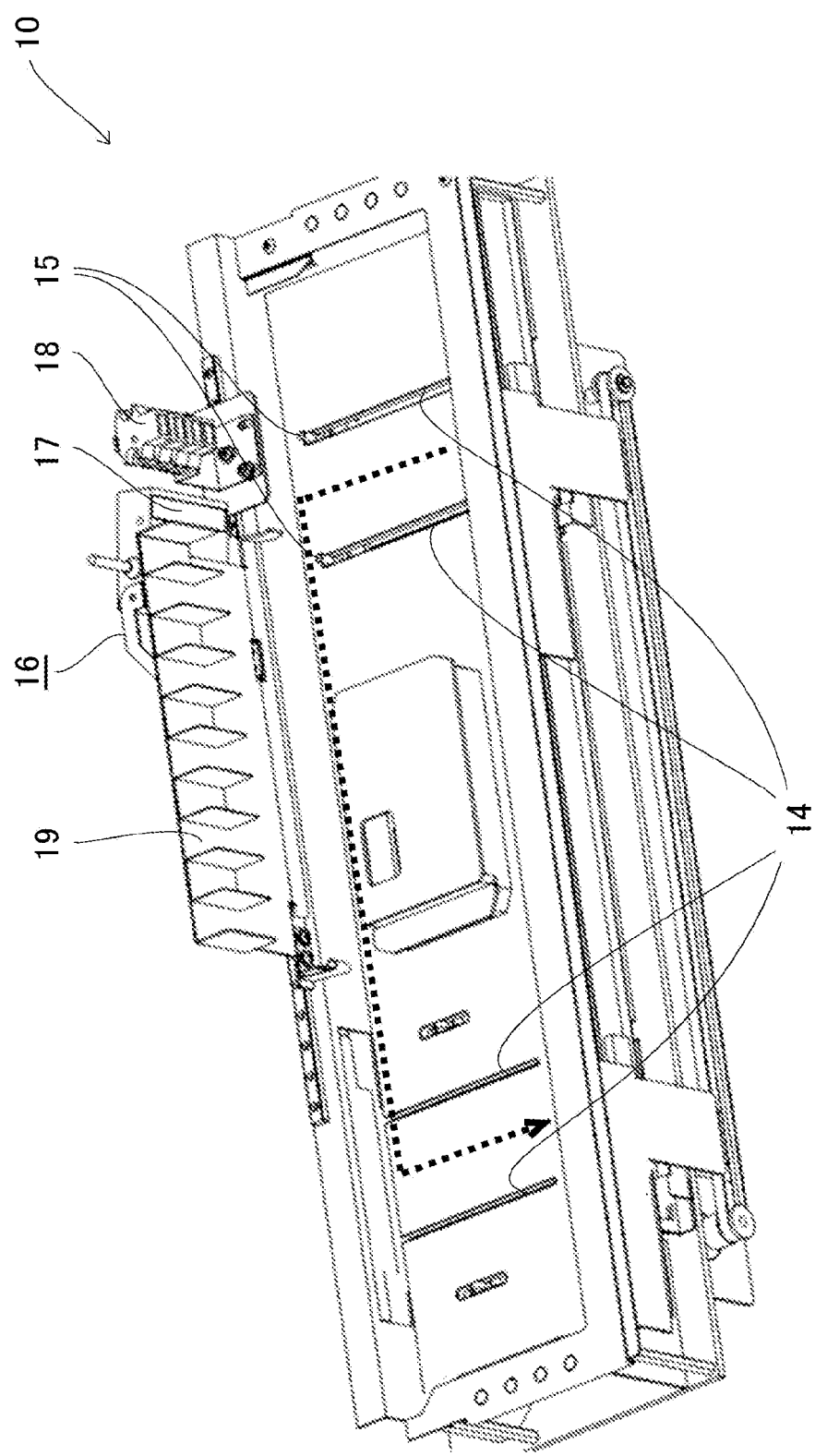
FIG. 4 is a perspective view depicting an example of a rack installing portion.

FIG. 4 is a perspective view depicting an example of the rack-installing portion. The rack-installing portion 10 includes: slits 14 formed on a table on which the sample rack 11 is placed, protruding pieces 15, a transporting device 16, a container-identifying device 17, a container type-determining device 18, a rack-detecting device (not illustrated) disposed under the table, and a cover 19 disposed on the transporting device 16. The rack-detecting device is a ceramic sensor disposed under the table of the rack-installing portion 10. The sample rack 11 includes magnets disposed on both ends of the bottom surface thereof in the longitudinal direction, and the computer connected to the rack-detecting device can detect the presence of the sample rack 11 via the rack-detecting device. The slits 14 are disposed in the front-back direction of the composite analysis device 1000. Each protruding piece 15 protrudes from the respective slit 14 or is contained in the slit 14, and also moves along the slit 14 so as to transport the sample rack in the front-back direction. The transporting device 16 holds the left and right edges of the sample rack, and transports the sample rack in the left-right direction. The container-identifying device 17 is, for example, a laser type barcode reader that receives laser light emitted by a laser diode using a light-receiving element and reads the data, or a camera connected to image recognition software on the computer, and the container-identifying device 17 reads the identification information attached to the side face of the sample container 13. The container type-determining device 18 is a plurality of infrared sensors which are disposed vertically (in the height direction), for example. The container type-determining device 18 detects the height of the sample container 13 held by the sample rack 11, and determines the type of the sample container 13 based on the height. The transporting device 16 is on the left side facing the composite analysis device 1000, and the container-identifying device 17 and the container type-determining device 18 are on the right side thereof. The container-identifying device 17 and the container type-determining device 18 are connected to the transporting device 16 respectively, and move in tandem.

The sample rack 11 is transported on the rack-installing portion 10 in the broken line arrow direction. The user loads the sample rack 11 on the right side facing the composite analysis device 1000. The protruding pieces 15 push the sample rack 11 to the back of the rack-installing portion 10 along the slits 14. A preceding sample rack 11 is transported to the left side by the transporting device 16, and the identification information attached to the subsequent sample rack 11 or to each sample container 13 held thereon is read by the container-identifying device 17, and the type of each sample container 13 is determined by the container type-determining device 18. The cover 19 is a wall surface that is disposed to cover each of the sample containers 13 held by the sample rack 11, and prevents insertion of fingers so that the user has no contact with the nozzle during sampling.

The cuvette feeder 20 supplies a cuvette having a predetermined shape for use in the composite analysis device 1000. A cuvette is a container in which a predetermined reaction is caused to a specimen, and is used for analysis. Using a predetermined mechanism, the cuvette feeder 20 supplies cuvettes, loaded on a hopper (not illustrated) one-by-one in a predetermined orientation, from the cuvette supply port 21, which is on the edge of the slope-shaped outlet.

Figure 5:
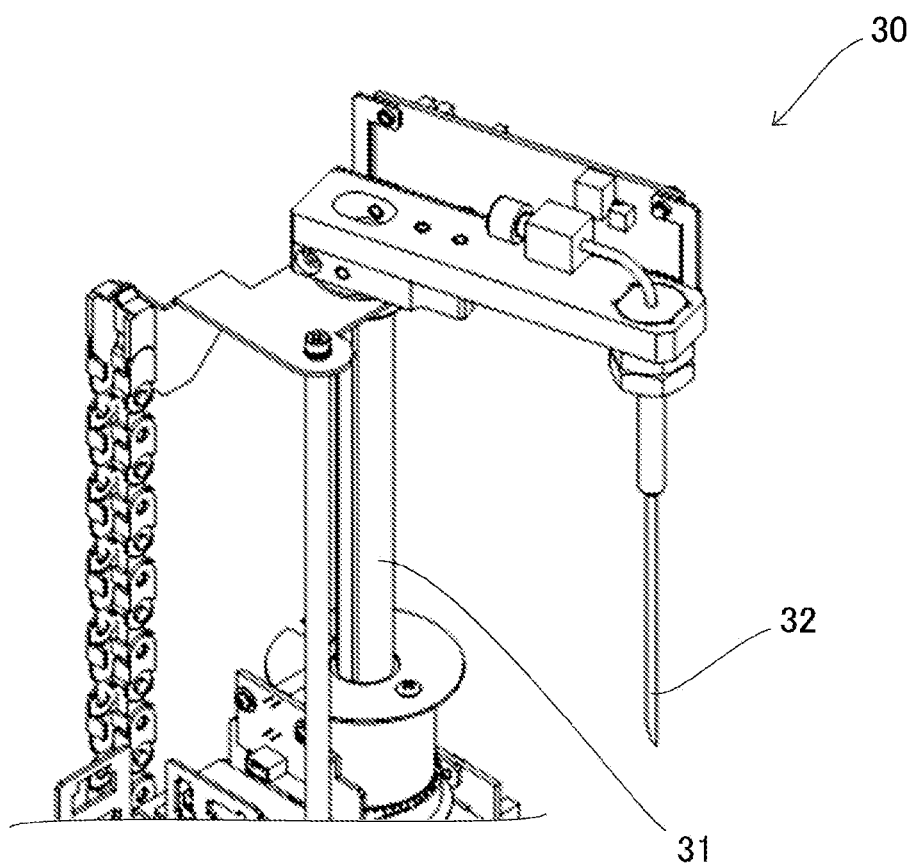
FIG. 5 is a perspective view depicting an example of a pierce nozzle unit.

FIG. 5 is a perspective view depicting an example of the pierce nozzle unit 30. The pierce nozzle unit 30 operates within a predetermined movable range by a shaft 31, which moves up and down in the perpendicular direction and also rotates, based on control by the computer. The pierce nozzle unit 30, which also includes a nozzle 32 that is connected to a pump (not illustrated), pierces a hole in a cap of the sealed sample container 13, which is held by the sample rack 11 installed in the rack-installing portion 10. The pierce nozzle unit 30 also collects a biological sample from the sample container 13, and discharges the biological sample into a cuvette held in the temporary-holding port 56 (also called a temporary-holding cuvette). In other words, the nozzle 32 performs piercing, suction and discharging using one nozzle.

The sample nozzle unit 33 also operates within a predetermined movable range by a shaft, which moves up and down in the perpendicular direction and also rotates, based on control by the computer. The sample nozzle unit 33 includes a nozzle which is connected to a pump, and collects a biological sample from the sample container 13 having an opening held by the sample rack 11, or from a temporary-holding cuvette, and discharges the biological sample into a cuvette held by the LPIA table 50. In other words, the sample nozzle unit 33 can also collect a sample from the sample container 13 having an opening (not illustrated) held by the sample rack 11.

The reagent nozzle unit 36 moves along the rail 70 based on control by the computer, and also moves up and down along a shaft extending in the perpendicular direction. Furthermore, the reagent nozzle unit 36 collects reagent from a reagent bottle held by the reagent table 60, and discharges the reagent into a predetermined cuvette using two nozzles connected to a pump. The two nozzles move up and down in the perpendicular direction independently from each other, so as to suck or discharge the reagent.

Figure 6:
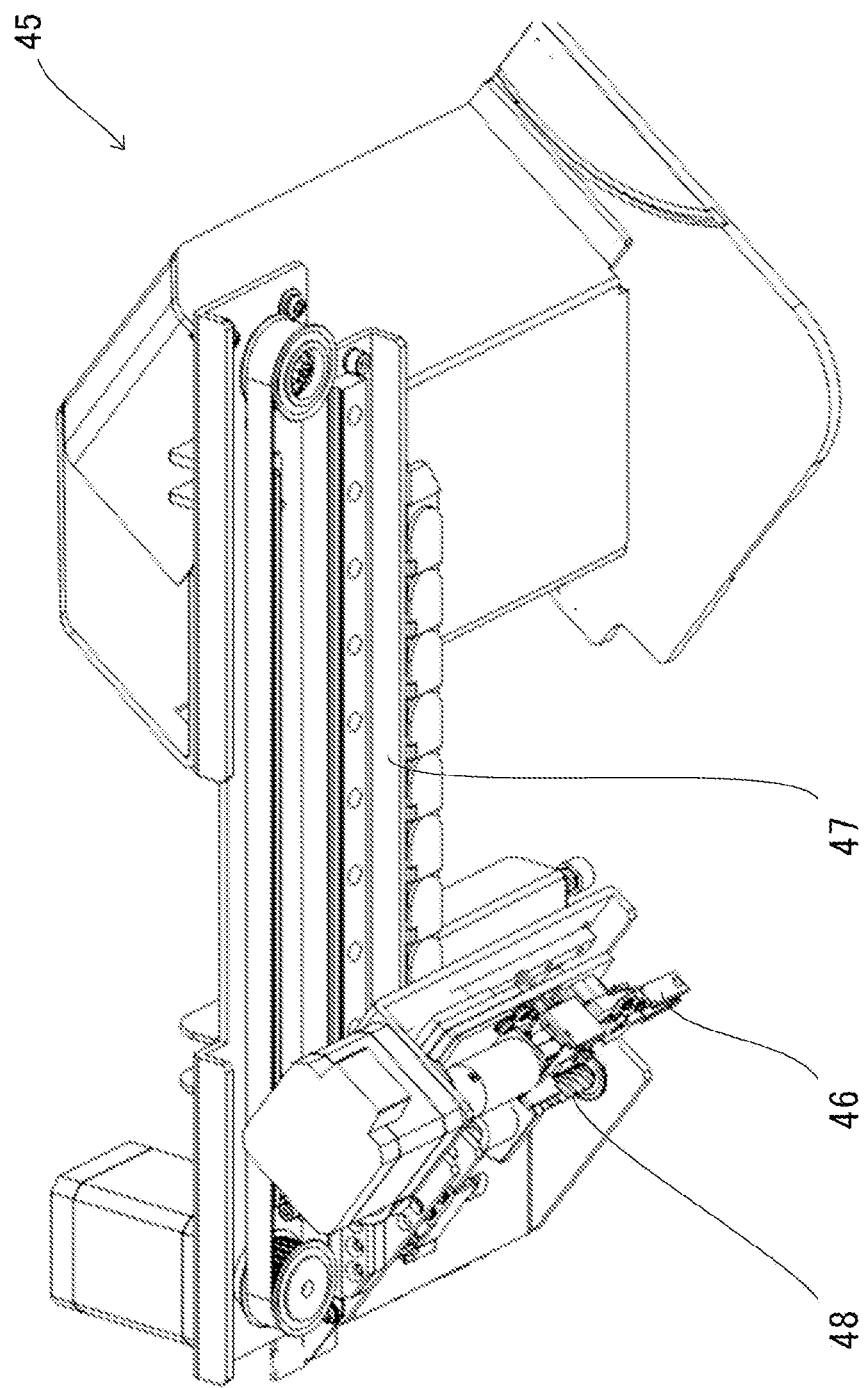
FIG. 6 is a perspective view depicting an example of a second cuvette-transporting unit.

FIG. 6 is a perspective view depicting an example of the second cuvette-transporting unit. The second cuvette-transporting unit 45 operates based on control by the computer, and includes a chuck (gripper) 46 to hold a cuvette. The chuck 46 linearly moves along a rail 47, and also moves up and down along a shaft 48 which extends in the perpendicular direction.

The first cuvette-transporting unit 40 also operates based on control by the computer, and includes a chuck to hold a cuvette. The chuck linearly moves along the rail 70, and also move up and down along a shaft extending in the perpendicular direction.

The LPIA table 50 has holding holes to hold a plurality of cuvettes in a circle. The antigen level on the LPIA table 50 is measured based on the latex coagulating method, for example. The LPIA table 50 is a disk type table that rotates around a predetermined rotation axis based on control by the computer. A plurality of holding holes, to hold cuvettes, are formed on the LPIA table 50 in a ring shape along the circumference thereof. Each cuvette is loaded or unloaded by the first cuvette-transporting unit 40 at a predetermined loading/unloading position. Reagent is injected into each cuvette at a predetermined dispensing position.

Figure 7:
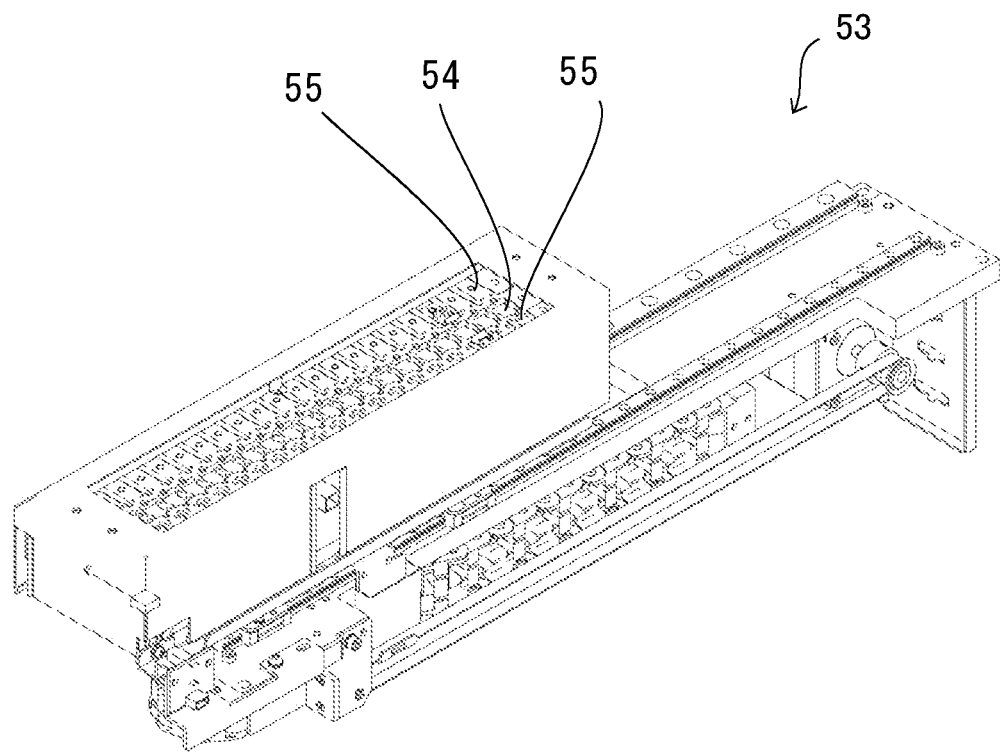
FIG. 7 is a perspective view depicting an example of a coagulation table.

FIG. 7 is a perspective view depicting an example of a coagulation table. The coagulation table 53 is a table on which cuvettes are placed when the blood coagulation time measurement is performed, for example. The coagulation table 53 has a plurality of holding holes 54 to hold the cuvettes linearly in a direction that is approximately vertical to the direction in which the rail 70 extends in a plan view. Each holding hole 54 has a sensor unit 55 which includes a light source and a light-receiving portion. The sensor unit 55 is disposed for each holding hole 54, and measures the absorbance or transmittance of light having a predetermined wavelength, for the content of a cuvette held by the holding hole 54, and outputs the result to the computer. Based on the absorbance or transmittance, the computer determines the degree of coagulation of the content in the cuvette.

The coagulation table 53 also includes a driving unit that slides a table portion in a direction approximately vertical to the direction where the rail 70 extends in a plan view. The computer can move a desired holding hole 54 to a predetermined loading/unloading position of a cuvette. At this time, the holding holes 54 and the sensor units 55 move in tandem with the table portion, and the absorbance or the like can be continuously measured for each cuvette being held, even if the table portion moves. The first cuvette-transporting unit 40 inserts the cuvettes into the holding holes 54, or removes the cuvettes from the holding holes 54 at the loading/unloading position. The cuvettes, into which reagents and samples are dispensed in the holding holes of the LPIA table 50, are transported to the holding holes 54 of the coagulation table 53 by the first cuvette-transporting unit 40.

Figure 8:
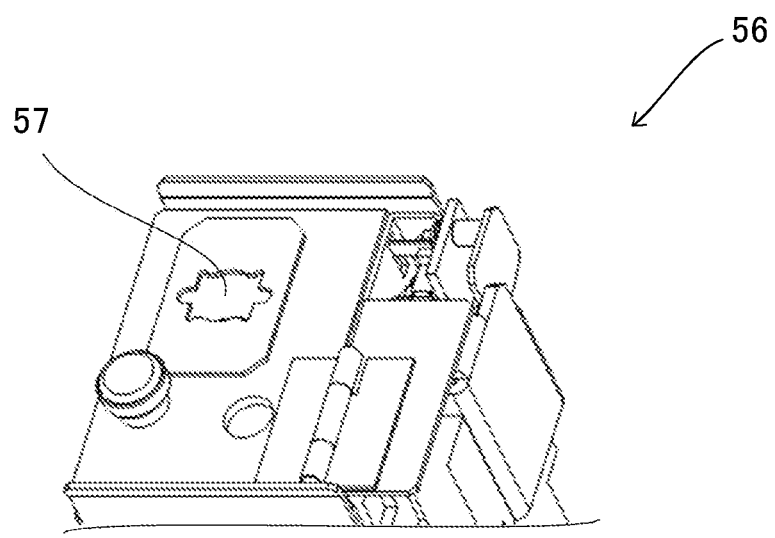
FIG. 8 is a perspective view depicting an example of a temporary-holding port.

FIG. 8 is a perspective view depicting an example of the temporary-holding port 56. The temporary-holding port 56 functions as a containing unit that temporarily contains a specimen. The temporary-holding port 56 includes a holding hole 57 to temporarily hold a cuvette. In the present embodiment, the pierce nozzle unit 30 dispenses the specimen from the sample container 13 on the sample rack 11 into a temporary-storing cuvette. Then the sample nozzle unit 33 further dispenses a specimen from the temporary-holding cuvette into a cuvette held by the LPIA table 50.

The reagent table 60 is a table on which a plurality of holding units, each of which holds a reagent bottle containing a predetermined reagent, are disposed. The holding units are disposed in a circle on the reagent table 60. The holding units may be disposed in double concentric circles, and a number of holding units and a number of circles are not especially limited. The reagent is latex or a coagulation time reagent, for example, but is not limited to these. The configuration of the reagent table may be changed in accordance with the type of the measurement principle. The reagent table 60 rotates clockwise or counterclockwise, and stops at a predetermined position based on control by the computer. Then the reagent nozzle unit 36 collects reagent from the reagent bottle at a predetermined collecting position. Even if a type and a number of reagents to be used are different depending on the measurement method, a holding unit in which a desired reagent bottle is disposed can be moved to a predetermined collecting position by rotating the reagent table 60, whereby a reagent, in accordance with the measurement, can be used. The composite analysis device 1000 may include a reading device which optically reads the identification information, such as a barcode or a two-dimensional code, written on the label attached to each reagent bottle, so that a desired reagent bottle can be specified. If the composite analysis device 1000 reads the identification information attached to each reagent bottle and automatically stores the arrangement of the reagent bottles on the reagent table 60, the user can complete preparation simply by installing the reagent bottles required for measurement, without considering the installation location, which improves ease of use. Furthermore, the reagent table 60 includes a plurality of holding units, and a plurality of items can be measured without replacing reagent bottles, which is very convenient.

The reagent cap open/close unit 65 is a unit which operates in a predetermined movable range based on control by the computer, so as to open/close the cap of each reagent bottle. For example, a cap of a reagent bottle is connected by with a hinge, and includes a protruding portion which protrudes in an approximately vertical direction with respect to the cap. The tip of the reagent cap open/close unit 65 moves along the diameter direction of the reagent table 60 in the plan view. The tip of the reagent cap open/close unit 65 changes the position on a locus where the reagent bottle moves as the reagent table 60 rotates, then contacts with the protruding portion which protrudes from the cap, and opens the cap. The tip of the reagent cap open/close unit 65 also changes the position in the perpendicular direction using a predetermined driving mechanism. The tip presses the cap down in the perpendicular direction, so as to close the cap of the reagent bottle.

The rail 70 is a linear rail. The reagent nozzle unit 36 and the first cuvette-transporting unit 40 are connected to the rail 70 respectively, and move approximately parallel with the rail 70 along the direction in which the rail 70 extends.

The cuvette-disposing port 80 is a port to which the first cuvette-transporting unit 40 discards a cuvette to collect cuvettes in a disposal box stored in the tank-housing portion 200. In the tank-housing portion 200, a pipe or a slope, to guide the discarded cuvettes, may be formed above the cuvette-disposing port 80 to the disposal box.

Figure 9:
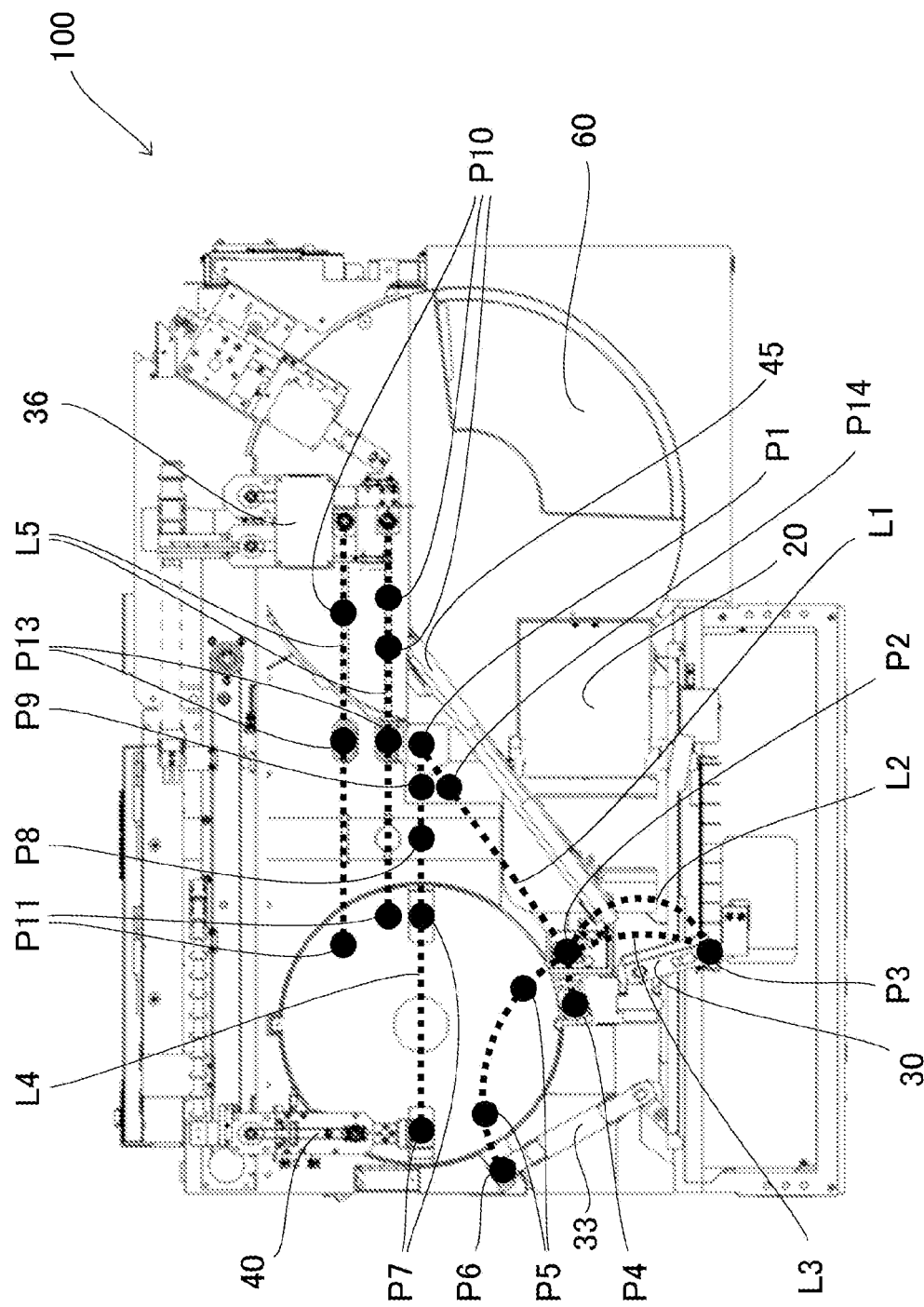
FIG. 9 is a diagram for describing transporting paths of cuvettes, and suction positions and discharging positions of a specimen and a reagent.

FIG. 9 is a diagram for describing a transporting path of cuvettes, and a suction position and a discharging position of a specimen and reagent. In FIG. 9, the path is indicated by the broken line, and the positions are indicated by black-filled circles. The loading/unloading position of a cuvette, and the collecting or discharging positions of the content are disposed at the intersections of the paths in the plan view. In FIG. 9, the moving paths of the sample rack 11 and the sample container 13 on the rack-installing portion 10, the moving path of a cuvette which is moved by the rotation of the LPIA table 50, and the moving path of a reagent bottle which is moved by the rotation of the reagent table 60, are not illustrated.

The cuvette feeder 20 supplies a cuvette to a cuvette supply position P1. The second cuvette-transporting unit 45 transports a cuvette along a locus L1. The second cuvette-transporting unit 45 moves the cuvette from the cuvette supply position P1 to a temporary-holding position P2. The pierce nozzle unit 30 moves the nozzle in an arc shape along a locus L2. At a sampling position P3, the pierce nozzle unit 30 collects a specimen from the sample container 13, and discharges the specimen into the cuvette at the temporary-holding position P2. The pierce nozzle unit 30 cleans the nozzle at a cleaning position P4. The sample nozzle unit 33 moves the nozzle in an arc shape along a locus L3. Then the sample nozzle unit 33 collects a sample at the temporary-holding position P2 or at the sampling position P3, and discharges the sample into the cuvette at a dispensing position P5. The sample nozzle unit 33 cleans the nozzle at a cleaning position P6. The first cuvette-transporting unit 40 transports the cuvette along a locus L4, and moves the cuvette between: the cuvette supply position P1; a loading/unloading position P7 of the LPIA table 50; an loading/unloading position P8 of the coagulation table 53, and the cuvette-disposing position P9. The reagent nozzle unit 36 moves two nozzles in parallel along a locus L5. Then the reagent nozzle unit 36 collects reagent from the reagent bottle at a collecting position P10 of the reagent table 60. The reagent nozzle unit 36 also discharges the reagent into the cuvette at an injecting position P11 of the LPIA table 50. The reagent nozzle unit 36 also cleans the nozzle at a cleaning position P13. The second cuvette-transporting unit 45 may discard the cuvette at a cuvette-discarding position P14 on the locus L1, and move the cuvette to the cuvette-disposing position P9 via a slope portion.

As mentioned above, the pierce nozzle unit 30 pierces a hole in the cover of the sample container 13 (e.g. a blood collection tube with a plug), and collects a specimen inside. The cap of the blood collection tube is, for example, a rubber plug, an overcap which includes a cover to prevent the contents from splashing when opened, or an aluminum cap, and it takes additional time to perform piercing a hole when collecting the specimen. Further, a plurality of times of piercings increase the probability of the contaminants on the cap entering into the specimen, and some types of caps are not suitable to be pierced a plurality of times. In the case of the composite analysis device 1000 according to the present embodiment, while the sample nozzle unit 33 dispenses the required volume of the specimen from the temporary-holding cuvette, in accordance with the order of measurement items, into the cuvettes held by the LPIA table 50, the pierce nozzle unit 30 collects all required volume of the specimen from the subsequent sample containers 13 in accordance with the order of measurement items. By performing the operation in parallel like this, the overall required time can be shortened in the case of performing a plurality of measurement processing steps continuously. Furthermore, entry of contaminants on the cover into the specimen can be prevented.

For example, "performing the operation in parallel" refers to a state where: operation in the step of collecting a specimen, the step of discharging the specimen into the cuvette for temporary holding, the step of cleaning a nozzle, which are performed by the pierce nozzle unit 30 (this series of steps are referred to as the "pierce nozzle unit operation"); and operation in the step of collecting a specimen from the cuvette for temporary holding, the step of discharging the specimen into the cuvette held by the LPIA table 50, and the step of cleaning the nozzle, which are performed by the sample nozzle unit 33 (this series of steps are referred to as "sample nozzle unit operation"), are performed in parallel. Each step of the pierce nozzle unit operation and the sample nozzle unit operation is not limited to the above example, and the type, sequence and timing of each step may be the same as or different from the above description.

The reagent nozzle unit 36 and the first cuvette-transporting unit 40 move along the shared rail 70. In the composite analysis device 1000, the loading/unloading position P8 of the coagulation table 53, the loading/unloading position P7 of the LPIA table 50, the cuvette supply position P1, and the cuvette-disposing position P9 are on a line that is approximately parallel with the rail 70. The collecting position P10 of the reagent table 60 and the reagent injecting position P11 of the LPIA table 50 are also on a line that is approximately parallel with the rail 70. For example, the nozzle of the reagent nozzle unit 36 can be moved to the injecting position P11 of the LPIA table 50 by retracting the first cuvette-transporting unit 40 to the left side in the plan view. Further, the chuck of the first cuvette-transporting unit 40 can be moved to the cuvette supply port 21 of the cuvette feeder 20 by retracting the reagent nozzle unit 36 to the right side in the plan view. In a case where the composite analysis device, equipped with a plurality of measurement units, performs random measurement in which the sequence of inspection items to be measured can be freely specified, the transporting mechanism can be downsized and the overall cost of the device can be reduced by making movement of the first cuvette-transporting unit 40 and the reagent nozzle unit 36 simple linear operations, and power can also be conserved. Further, the first cuvette-transporting unit 40 and the reagent nozzle unit 36 can share the rail 70, which can prevent enlargement of the device. Moreover, by this configuration, a predetermined measurement time and space can be used more efficiently, and high measurement processing capability can be implemented.

The movable ranges of the pierce nozzle unit 30 and the sample nozzle unit 33 are not limited to a circular arc, but may be part of a curve, and an expert in the art can appropriately select and design accordingly. The nozzle unit may be rotated while extending/retracting the length of the portion of the nozzle unit extending in the horizontal direction, such that the tip of the nozzle draws a clothoid curved arc.

<Computer>

Figure 10:
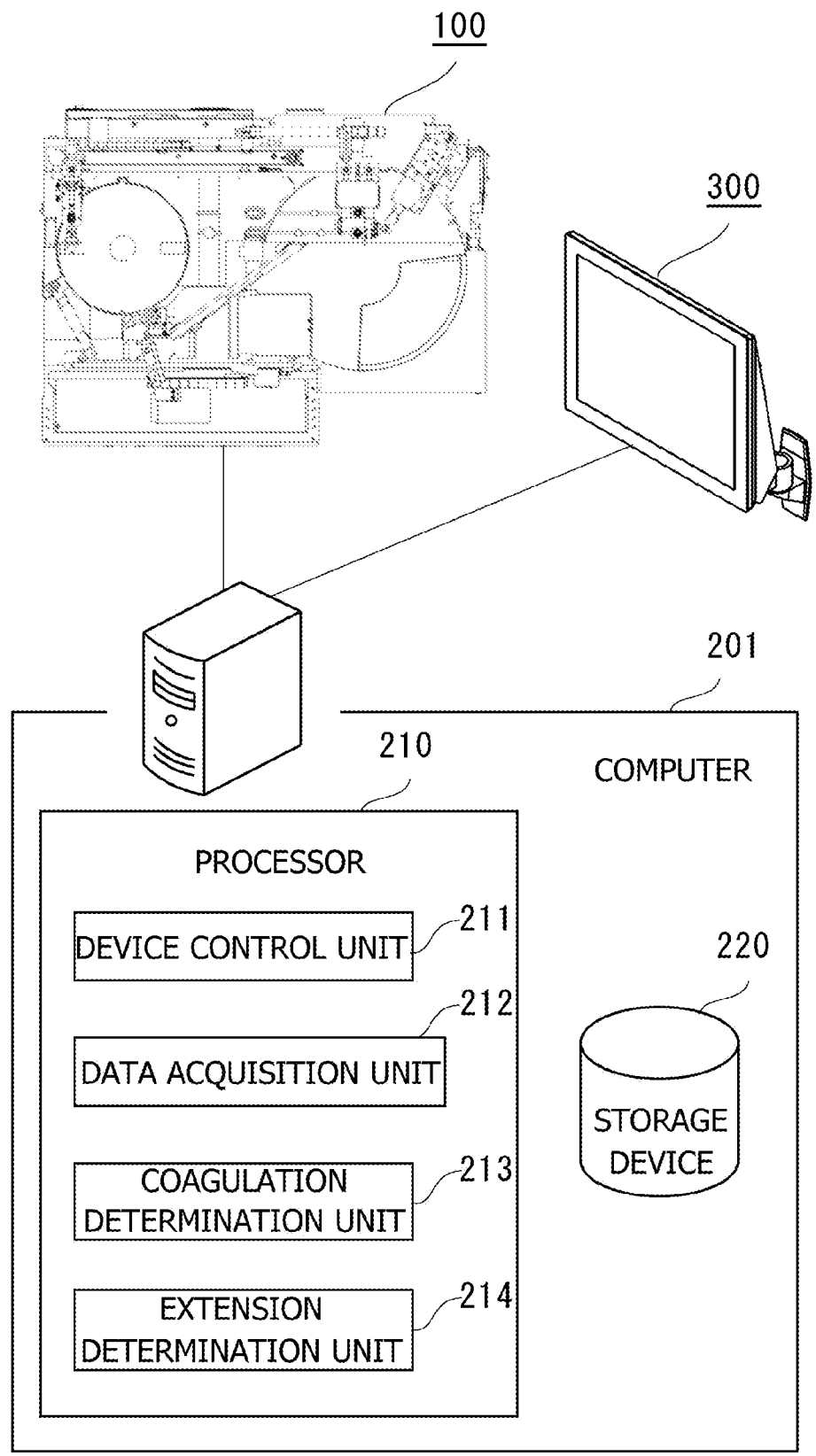
FIG. 10 is a block diagram depicting an example of a computer included in the composite analysis device.

FIG. 10 is a block diagram depicting an example of a computer (also referred to as "control device") included in the composite analysis device. The computer 201 includes a processor 210 and a storage device 220, and is connected to each measurement unit housed in the measurement unit-housing portion 100, a monitor 300, and the like, via an input/output interface.

The processor 210 is an arithmetic device, such as a central processing unit (CPU), and performs processing steps according to the present embodiment by executing predetermined programs. In the example in FIG. 10, functional blocks are indicated in the processor 210. In other words, the processor 210 functions as a device control unit 211, a data acquisition unit 212, a coagulation determination unit 213, and an extension determination unit 214. The device control unit 211 controls the composite analysis device 1000 such that the specified analysis is performed on a specimen based on the order information of measurement items inputted by the user. The data acquisition unit 212 acquires data outputted by the sensors and the like disposed in the measurement unit via a predetermined input/output interface. The coagulation determination unit 213 determines the degree of coagulation of blood in each cuvette, based on the absorbance of the cuvette acquired from the sensors and the like of the coagulation table 53. The extension determination unit 214 determines whether the measurement of each cuvette is ended or extended at a predetermined timing, based on the determination of the coagulation determination unit 213.

The storage device 220 is, for example, a main storage device, such as a random access memory (RAM) and a read only memory (ROM), or an auxiliary storage device, such as a hard disk drive (HDD), a solid-state drive (SSD), an embedded multi-media card (eMMC), and a flash memory. The main storage device secures a work area of the processor 210, and temporarily stores data or the like outputted by sensors. The auxiliary storage device stores programs related to the present embodiment, data acquired from measurement units, and other data.

<Measurement Start Processing>

Figure 11:
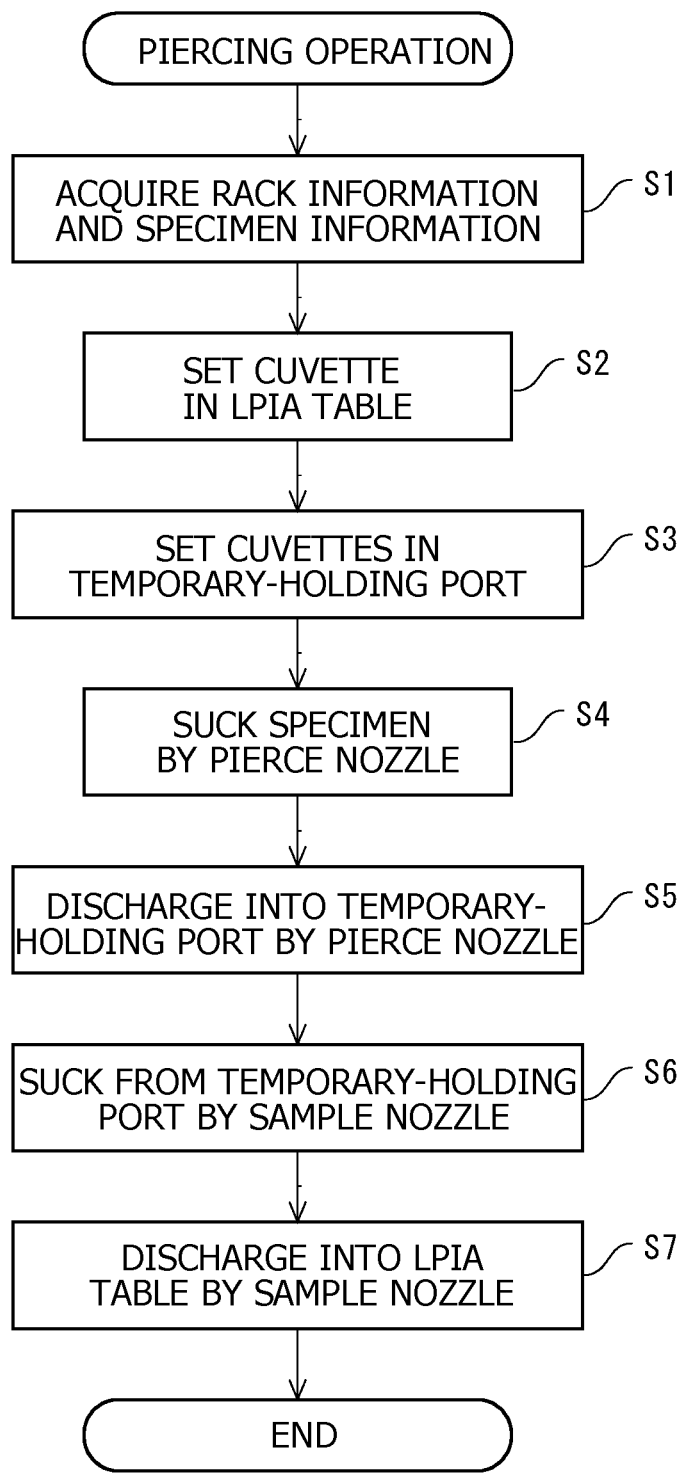
FIG. 11 is a flow chart depicting an example of processing steps when the measurement involving the piercing operation is started.

FIG. 11 is a flow chart depicting an example of processing steps when measurement involving the piercing operation is started. The device control unit 211 of the composite analysis device 1000 transports a sample rack 11 to a predetermined position of the rack-installing portion 10, and reads the identification information attached to the sample rack 11 and the identification information attached to the sample container 13 held by the sample rack 11 via the container-identifying device 17 (FIG. 11: S1). Here it is assumed that whether or not a blood collection tube with a plug is held by the sample rack 11 is determined based on the identification information attached to the sample rack 11.

In the present embodiment, in a case where the rack information on the sample container 13 which was read in S1 indicates that the rack holds a blood collection tube having a plug, the subsequent processing steps are executed. In a case where the rack information indicates that the rack holds a sample container 13 without a plug, on the other hand, a specimen is directly dispensed from the sample container 13 via the sample nozzle unit 33, for example. It is assumed that the order information on the inspection items to be measured for the specimen contained in the sample container 13 has been inputted in the computer 201 in advance, in a state of being linked with the identification information attached to the sample container 13.

FIG. 12 is a table indicating an example of order information. The order information is inputted for each sample rack 11 in advance, in the state of being linked with the identification information of the sample rack 11. The table in FIG. 12 includes each column of: a position, specimen ID, volume, remaining time, FDP, D-dimer, antithrombin, prothrombin time, activated thromboplastin time, and fibrinogen. In the column of the position, a serial number to indicate a position of the holding hole 12 in the sample rack 11 is indicated. In the column of the specimen ID, identification information to identify a specimen contained in the sample container 13 held in each holding hole 12 is inputted. In the column of a volume, the total volume of each specimen required for the inspection performed on the specimen is calculated and registered. For the remaining time, remaining time required for the inspection is calculated and registered. Each column of FDP, D-dimer, antithrombin, prothrombin time, activated thromboplastin time, and fibrinogen indicates the inspection item respectively, and information on whether or not this inspection is performed for the specimen is inputted. In FIG. 12, a volume of the specimen required for the inspection is predetermined for each inspection item, as indicated below the name of each inspection item. In the example in FIG. 12, the inspection item for which a circle is inputted is performed. For each inspection, a required volume of a specimen is predetermined, and the total volume required for each specimen can be calculated based on the order information. The total volume includes a 50 µL of dead volume, which is a volume of the specimen which adheres to the cuvettes for temporary holding and the nozzles in the dispensing steps, and cannot be used for the inspection.

The device control unit 211 causes the first cuvette-transporting unit 40 to set a cuvette supplied by the cuvette feeder 20 at the loading/unloading position of the LPIA table 50 (S2). The device control unit 211 also causes the second cuvette-transporting unit 45 to set a cuvette supplied by the cuvette feeder 20 at the loading/unloading position of the temporary-holding port 56 (S3). In S3, a new cuvette is set after discarding a used cuvette being held in the temporary-holding port 56. The sequence of S2 and S3 may be reversed, or S2 and S3 may be executed in parallel.

Then the device control unit 211 causes the pierce nozzle unit 30 to suck the specimen from the sample container 13, which exist at the collecting position of the rack-installing portion 10 (S4). In this step, the device control unit 211 raises the nozzle 32 of the pierce nozzle unit 30 and rotates the nozzle 32 to the sampling position P3 of the specimen. Then the device control unit 211 lowers the nozzle 32, pierces a hole in the sample container 13, and sucks the specimen contained in the sample container 13. The volume that is sucked here is the total volume of the specimen to be used for the target inspection indicated in the column "Volume" in FIG. 12. Out of the volume of the specimen that is sucked here, the volume of the specimen that adheres to the cuvette is held temporarily, and the nozzle in the processing (that is, dead volume) is subtracted, and the remainder becomes the net volume of specimen to be used for the inspection. Therefore in this step, the total volume of the specimen required for the inspection and an extra volume are sucked, so that the net volume becomes the volume of the specimen required for the inspection. The extra volume is the dead volume, and is a volume that is not included in the specimen volume used for the coagulation time measurement, for example. In other words, the volume sucked here is more than the volume required for the inspection, but the volume required for executing the blood coagulation time measurement processing related to the re-inspection is not included. Specifically, the extra volume is 100 µL or less, preferably 80 µL or less, more preferably 50 µL or less, and even more preferably 30 µL or less, for example. This makes it unnecessary to hold the volume that may be required for re-inspection of the inspection item (volume reserved for re-inspection), which is preferable.

Further, the device control unit 211 moves the pierce nozzle unit 30 to the temporary-holding port 56 and discharges the specimen into the cuvette for temporary holding (S5). In this step, the device control unit 211 raises the nozzle 32 of the pierce nozzle unit 30 and rotates the nozzle 32 to the temporary-holding position P2 of the specimen. Then the device control unit 211 lowers the nozzle 32 and discharges the specimen into the cuvette for temporary holding.

Further, based on the inspection items of the order information, the device control unit 211 causes the reagent nozzle unit 36 to suck a predetermined reagent from the reagent table 60. The device control unit 211 also moves the reagent nozzle unit 36 to the injecting position P11 of the LPIA table 50, and discharges the reagent into the predetermined cuvette (S6). The device control unit 211 rotates the LPIA table 50 and moves the cuvette, in which the reagent was injected at the injecting position P11 in S6, to the dispensing position P5 in advance.

Furthermore, the device control unit 211 causes the sample nozzle unit 33 to suck the specimen from the cuvette for temporary holding. The device control unit 211 also moves to the dispensing position P5 of the LPIA table 50, and discharges the specimen into a predetermined cuvette (S7). In this way, the measurement of inspection items ordered for the specimen can be started. The device control unit 211 transports the cuvettes on the LPIA table 50 to the coagulation table 53 using the first cuvette-transporting unit 40 at appropriate timings.

The processing steps S6 and S7 are repeatedly performed for a number of inspection items included in the order information. The series of piercing operations are performed for a number of specimens. While executing the processing steps S6 and S7 for a preceding specimen, the processing steps S4 and S5 can be executed for the subsequent specimen. In other words, the dispensing processing of the preceding specimens in the temporary-holding port 56 (a plurality of dispensing operations not involving piercing holes) and collecting processing from the sample containers 13 of the subsequent specimen (suction involving piercing holes) may be executed in parallel. Then in the case of performing various measurement processing steps continuously on a plurality of specimens, overall time required for the processing steps can be shortened. Moreover, it is not necessary to pierce a hole continuously into one sample container 13, and entry of contaminants on the cap into the specimen can be prevented.

In the case of a composite analysis device that performs various measurements, in particular, a shortage of the volume of the specimen may occur if the volume used for re-inspection is reserved in advance. In the present embodiment, however, a shortage of the specimen can be prevented by securing only a total volume of specimens required for the inspection in S4. For the coagulation time measurement, a high volume of the specimen is used than in the measurement by the latex coagulation method. For example, in the measurement by the latex coagulation method, several μL of the specimen is needed for measurement of one inspection item, while several tens of μL of specimens are required in the case of the coagulation time measurement. In other words, in the case of performing a plurality of coagulation time measurement tests, it becomes more difficult to secure the specimen for re-inspection. Therefore in the case where the coagulation time measurement is ordered, in particular, only the volume corresponding to the above mentioned dead volume may be added to the total volume of the specimen to be used for the target inspection, and the specimen may be moved from the sample container to the cuvette for temporary holding. In other words, the volume of the specimen that is moved from the sample container to the cuvettes for temporary holding does not include the specimen used for re-inspection in the coagulation time measurement.

<Measurement Time Extension Processing>

Figure 13:
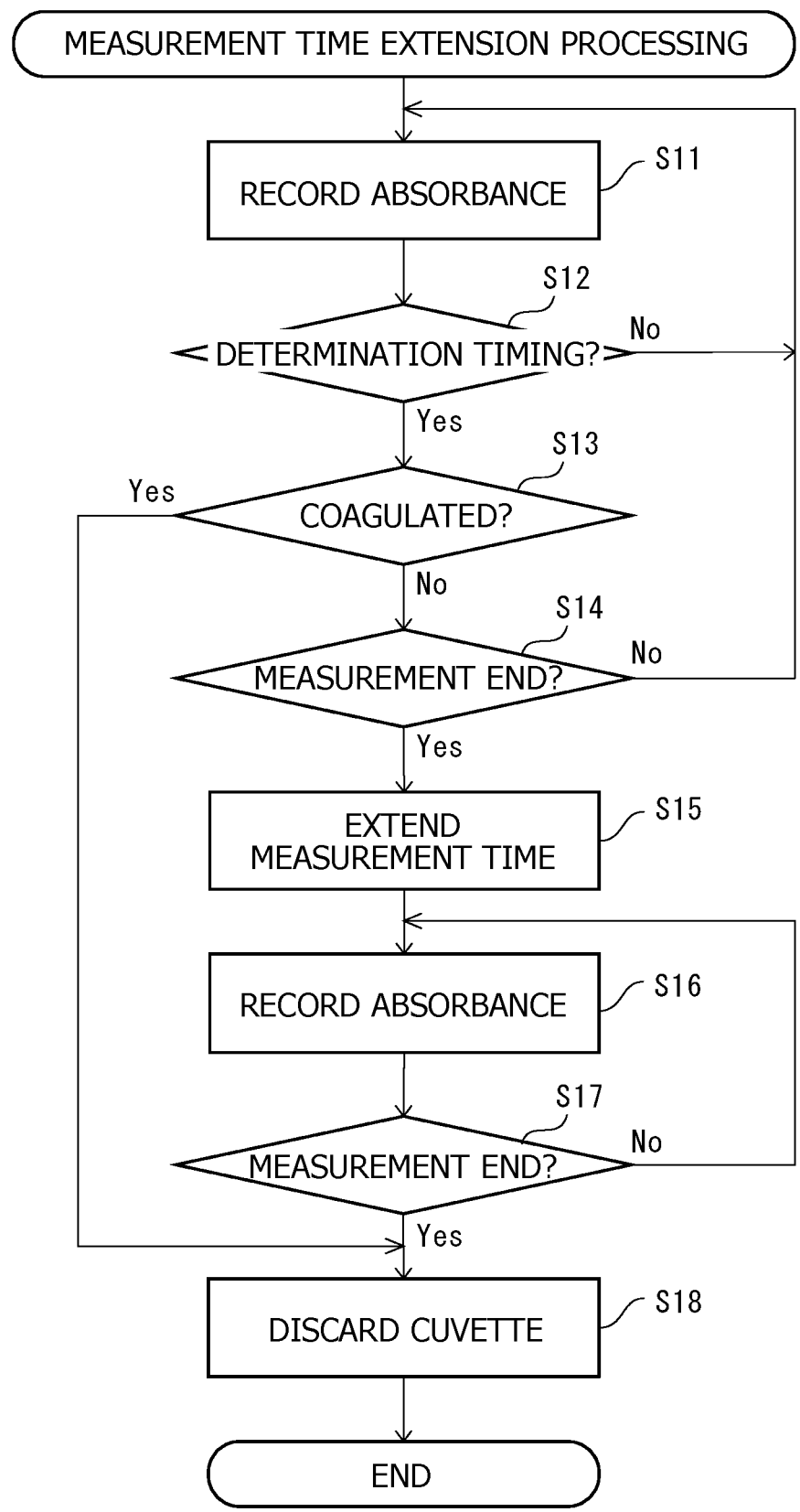
FIG. 13 is a flow chart depicting an example of measurement time-extension processing steps.

FIG. 13 is a flow chart depicting an example of measurement time extension processing steps. The data acquisition unit 212 of the composite analysis device 1000 acquires information indicating the absorbance for each cuvette held on the coagulation table 53, and stores the information in the storage device 220 (FIG. 13: S11). The coagulation determination unit 213 determines whether a predetermined determination timing has arrived (S12). In the present embodiment, the predetermined determination timing is set to 30 seconds, 60 seconds, 120 seconds, 180 seconds and 210 seconds after the start of measurement. If it is determined that the determination timing has not yet arrived (S12: NO), processing returns to S11, and the same determination is repeated. If it is determined that the determination timing has arrived (S12: YES), on the other hand, the coagulation determination unit 213 determines whether the specimen in the cuvette is coagulated (S13). The coagulation determination unit 213 determines based on the comparison between the absorbance value and a predetermined threshold. If it is determined that the specimen in the cuvette is not coagulated (S13: NO), the coagulation determination unit 213 determines whether the predetermined measurement time, which is initially predetermined, has elapsed (S14). In the present embodiment, the initial measurement time is 210 seconds, for example. Further, in the present embodiment, the schedule of replacing the cuvettes held on the coagulation table 53 is set, regarding this measurement time as the replacement cycle. In other words, until the measurement time elapses, cuvettes are not discarded, even if measurement is completed. Then processing performance per unit time can be ensured. If it is determined that the predetermined measurement time has not yet elapsed (S14: NO), processing returns to S11, and a same determination is repeated.

If it is determined that the predetermined measurement time has elapsed (S14: YES), on the other hand, the measurement time is extended, and a re-inspection mode is started (S15). In the re-inspection mode, the measurement end time is extended to 360 seconds, and the measurement is continued. In other words, the data acquisition unit 212 acquires information to indicate the absorbance for each cuvette held on the coagulation table 53, and stores the information in the storage device 220 (S16). The processing in S16 is the same as S11. Then the data acquisition unit 212 determines whether the measurement is ended (S17). In this step it is determined whether 360 seconds, which is the extended measurement end time, has elapsed since the start of the measurement. If it is determined that the measurement end time has not yet elapsed (S17: NO), processing returns to S16, and measurement is continued. If in S17 it is determined that the measurement end time has elapsed (S17: YES), or if it is determined that the specimen is coagulated in S13 (S13: YES), on the other hand, the device control unit 211 discards this cuvette (S18). In this step, the cuvette, of which measurement has ended, is moved to the loading/unloading position by sliding the coagulation table 53, and the first cuvette-transporting unit 40 holds and transports the cuvette to the cuvette-disposing port 80, and discards the cuvette.

The time required for the blood to coagulate is normally about 10 to 12 seconds in the case of PT, and about 25 to 40 seconds in the case of APTT, if the specimen is normal. In the measurement time extension processing, the schedule of replacing the cuvettes placed on the measurement unit is determined based on the measurement time which it normally takes to end a predetermined reaction (e.g. 210 seconds), and in the case where the reaction does not end even if the reference time has elapsed, the measurement time is extended and measurement processing is continued. This means that it is unnecessary to reserve a longer measurement time for one specimen, and a drop in processing efficiency can be prevented. If the measurement is ended once when the reference measurement time elapsed and the measurement is executed again for the specimen of which a predetermined reaction has not completed, it would take time for re-inspection, and the specimen of which reaction ended as an incomplete would be wasted, which is inefficient. By continuing measurement only in a case where the reaction has not ended, even if the initially set measurement end time has elapsed, the waste of both time and specimen can be prevented, and processing efficiency improves. This extension processing is not limited to the coagulation of blood, but may be applied to processing steps to determine the degree of progress of an arbitrary reaction. By combining this measurement time extension processing with the regular measurement processing steps, ordered measurement can be performed without reserving an extra specimen for re-inspection in the piercing operation, and a shortage of the specimen can be prevented.

<Other>

The above embodiment and modifications thereof are examples, and the present invention is not limited by the above mentioned configurations. The contents described in the embodiment and the modifications may be combined as much as possible within a scope of not departing from the problem to be solved and the technical concepts of the present invention.

The present invention includes a method and computer program for executing the above mentioned processing steps, and a computer-readable recording medium recording the program. The recording medium recording the program can implement the above processing steps by causing the computer to execute the program.

The computer-readable recording medium refers to a recording medium that can store such information as data and programs by electrical, magnetical, optical, mechanical or chemical functions, and a computer can read the information from the recording medium. Out of such recording media, a recording medium that is removable from the computer is a flexible disk, a magneto-optical disk, an optical disk, a magnetic tape and a memory card, for example. A recording medium fixed to the computer is an HDD, a solid-state drive (SSD) and ROM, for example.

REFERENCE SIGNS LIST

1000 Composite analysis device
100 Measurement unit-housing portion
10 Rack-installing portion
11 Sample rack
20 Cuvette feeder
30 Pierce nozzle unit
33 Sample nozzle unit
36 Reagent Nozzle unit
40 First cuvette-transporting unit
45 Second cuvette-transporting unit
50 LPIA table
53 Coagulation table
60 Reagent table
70 Rail
80 Cuvette-disposing port
200 Tank-housing portion
201 Computer (control device)
210 Processor
211 Device control unit
212 Data acquisition unit
213 Coagulation determination unit
214 Extension determination unit
220 Storage device
300 Monitor

What is claimed is:

1. An analysis device comprising a pierce nozzle, a sealed sample container in which a biological sample is contained, a predetermined container, a sample nozzle, one or more cuvette(s), an absorbance sensor configured to indicate a degree of coagulation of blood and a control device wherein the analysis device is configured to perform a plurality of measurement processing steps for the biological sample based on order information, the measurement processing steps comprising:

piercing with the pierce nozzle a hole in the sealed sample container in which the biological sample is contained, collecting the biological sample, and discharging the biological sample into the predetermined container;

dispensing from the sample nozzle the biological sample contained in the predetermined container into the one or more cuvettes; and controlling with the control device operations of the pierce nozzle and the sample nozzle based on the order information, wherein the control device is configured to discharge a volume of the biological sample from the pierce nozzle into the predetermined container, wherein the volume of the biological sample is not less than a total volume of a specimen required for each of the measurement processing steps included in the order information which includes one or more blood coagulation time measurement processing steps, and wherein the volume of the biological sample does not include a volume required for performing the blood coagulation time measurement processing step related to re-examination;

wherein the sample nozzle is configured to collect the biological sample from the sample container having an opening, and wherein a first position at which the pierce nozzle collects the biological sample from the sealed sample container is the same as the first position at which the sample nozzle collects the biological sample from the sample container having the opening; and and wherein a second position of the predetermined container to which the biological sample is discharged from the pierce nozzle is the same as the second position of the sample container from which the sample nozzle collects the biological sample.

2. The analysis device according to claim 1, wherein the volume of the biological sample discharged from the pierce nozzle into the predetermined container is not less than the volume of a specimen required for each of the measurement processing steps included in the order information, and does not include the volume required for performing the blood coagulation time measurement processing step related to re-examination, wherein the absorbance sensor, which holds the one or more cuvette(s) and outputs data, is configured to indicate the degree of coagulation of blood contained in the one or more cuvette(s) to the control device, and wherein in a case where a measurement time, which is an initially determined replacement cycle of the one or more cuvette(s) in the absorbance sensor, elapses and it is determined that the blood has not coagulated, based on the data outputted by the absorbance sensor, the control device extends the measurement time and continues the measurement processing step.

3. The analysis device according to claim 1, wherein:
the control device is configured to execute in parallel:
a first processing step to cause the sample nozzle to collect the biological sample from the predetermined container and dispense the biological sample into the one or more cuvette(s), which is performed for a preceding processing target biological sample; and
a second processing step to cause the pierce nozzle to collect another biological sample from the sealed sample container and discharge the another biological sample into the predetermined container, which is performed for a subsequent processing target biological sample.

4. The analysis device according to claim 1, wherein:
the pierce nozzle and the sample nozzle have arc-shaped movable ranges centered around different points in a plan view, and
the first position at which the pierce nozzle collects the biological sample from the sealed sample container, the first position at which the sample nozzle collects the biological sample from the sample container having the opening, the second position of the predetermined container from which the biological sample is discharged from the pierce nozzle, and the second position in the predetermined container at which the sample nozzle collects the biological sample are located at intersections of the movable range of the pierce nozzle and the movable range of the sample nozzle respectively in the plan view.

5. An analysis method executed by an analysis device configured to perform a plurality of measurement processing steps for a biological sample based on order information, comprising:
piercing with a pierce nozzle a hole in a sealed sample container in which the biological sample is contained, collecting the biological sample, and discharging the biological sample into a predetermined container containing unit; and
dispensing from a sample nozzle unit dispensing the biological sample contained in the predetermined container into one or more cuvette(s), wherein:
a volume of the biological sample which is discharged from the pierce nozzle unit into the predetermined container is not less than a total volume of a specimen required for each of the measurement processing steps included in the order information which includes one or more blood coagulation time measurement processing steps, and wherein the volume of the biological sample does not include a volume required for performing the blood coagulation time measurement processing step related to re-examination;
the sample nozzle is configured to collect the biological sample from the sample container having an opening, and a first position at which the pierce nozzle unit collects the biological sample from the sealed sample container is the same as a first position at which the sample nozzle collects the biological sample from the sample container having the opening; and
a second position of the predetermined container to which the biological sample is discharged from the pierce nozzle is the same as a second position of the predetermined container from which the sample nozzle collects the biological sample.

6. A non-transitory computer readable medium that comprises a memory encoded with an analysis program configured to cause an analysis device configured to perform a plurality of measurement processing steps for a biological sample based on order information to execute the following steps:
piercing a hole with a pierce nozzle in a sealed sample container in which the biological sample is contained, collecting the biological sample, and discharging the biological sample into a predetermined container; and
dispensing with the sample nozzle the biological sample contained in the predetermined container into one or more cuvette(s), wherein
discharging a volume of the biological sample from the pierce nozzle into the predetermined container is not less than a total volume of a specimen required for each of the blood coagulation time measurement processing steps included in the order information which includes one or more blood coagulation time measurement processing steps, and the volume of the biological sample does not include a volume required for performing the measurement processing step related to re-examination;
the sample nozzle is configured to collect the biological sample from the sample container having an opening, and wherein a first position at which the pierce nozzle collects the biological sample from the sealed sample container is the same as a first position at which the sample nozzle collects the biological sample from the sample container having the opening; and
wherein a second position of the predetermined container to which the biological sample is discharged from the pierce nozzle is the same as a second position of the predetermined container from which the sample nozzle collects the biological sample.

* * * * *

UNITED STATES PATENT AND TRADEMARK OFFICE
CERTIFICATE OF CORRECTION

PATENT NO. : 12,436,161 B2
APPLICATION NO. : 17/754420
DATED : October 7, 2025
INVENTOR(S) : Masatoshi Ishiguro et al.

It is certified that error appears in the above-identified patent and that said Letters Patent is hereby corrected as shown below:

In the Claims

In Column 16, Lines 53-54, delete "opening; and and wherein" and insert --opening; and wherein--.

Signed and Sealed this
Thirteenth Day of January, 2026

John A. Squires
*Director of the United States Patent and Trademark Office*